July 5, 1938.  W. IRBY  2,123,049

MIRROR

Filed Dec. 24, 1935

Inventor:
William Irby,
by Harry E. Dunham
His Attorney.

Patented July 5, 1938

2,123,049

UNITED STATES PATENT OFFICE 2,123,049

MIRROR

William Irby, Saugus, Mass., assignor to General Electric Company, a corporation of New York Application December 24, 1935, Serial No. 56,024

2 Claims. (Cl. 88—105)

My invention relates to mirrors used as reflectors in light projectors, and more particularly to mirror backings able to withstand high temperatures.

An object of my invention is to provide an improved mirror backing which will cause the reflecting surface of the mirror to retain its reflectivity under high temperature operating conditions for a longer period than has hitherto been possible.

Considerable difficulty has been encountered in maintaining a reasonable life in mirrors used for projectors, such as floodlights and searchlights in which the temperature of the mirror often rises as high as 350° C. Due to this extreme heat, the silver, which is the metal generally used for this purpose, becomes oxidized and, therefore, practically incapable of reflecting light. Attempts to prolong the life of these mirrors, by providing a protective coating which prevents air from reaching the mirror surface, have met with scant success, apparently due to the difficulty of providing any coating which remained airtight at the high temperatures.

In accordance with my invention, I prolong the life of mirror surfaces by providing a reducing agent, such as graphite, for example, between the layer of reflecting material and the protective coating. I apply this reducing agent preferably in the form of a paint. At the high operating temperatures, this reducing agent absorbs or combines with the oxygen that penetrates the protective layer and also with oxygen that may be entrapped or occluded in the metal layers of the mirror backing or in the glass itself. I find that by providing such layer of reducing agent I can increase the life of a mirror operating under high temperatures as much as 150% over similar mirrors not being provided with such reducing agent.

For a better understanding of my invention, together with other and further objects thereof, reference is had to the following description, taken in connection with the accompanying drawing, and its scope will be pointed out in the appended claims.

My invention may be applied to mirror backings comprising a layer of silver deposited upon the preformed glass and a layer of nickel applied electrolytically to reinforce the silver. Upon this layer of silver and nickel I apply, in accordance with my invention, a layer of paint containing a suitable amount of a reducing agent, such as graphite, for example. A protective coating of paint containing a comminuted metal is applied as a final coating.

Figure 1:
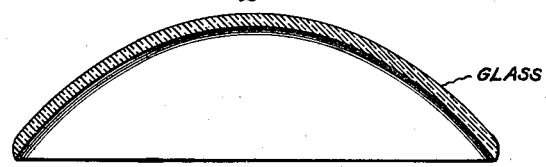
Figure 2:
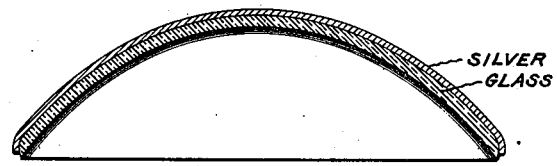
Figure 3:
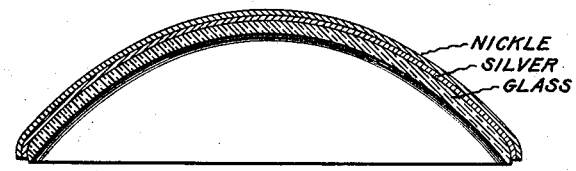
Figure 4:
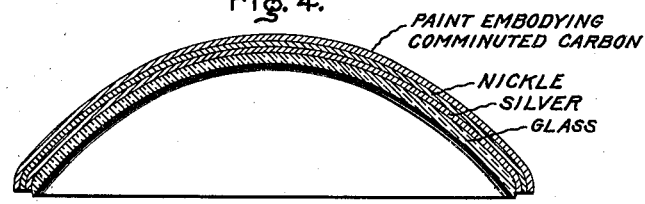
Figure 5:
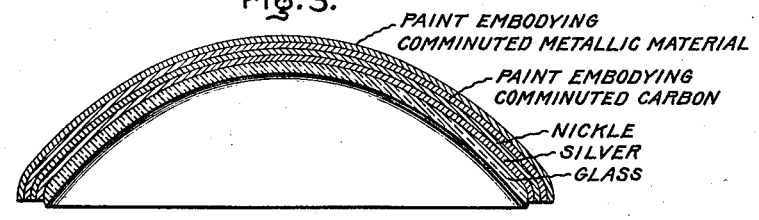

In the accompanying drawing, I have illustrated in Figs. 1 to 5 the successive layers of material making up a complete backing and including the reducing agent in accordance with my invention. The thickness of the individual layers is exaggerated for the purpose of illustration.

In order that the application of my invention may be fully understood, I shall describe hereafter the complete process of preparing a mirror backing. It is to be understood, however, that this is only by way of example and may be considerably varied within the scope of my invention.

A glass form having the proper shape, such as parabolic, hyperbolic or spherical, is first prepared for receiving the silver coating. For this purpose the surface is thoroughly washed with a strong caustic soda solution and nitric acid and then polished. After another thorough cleansing a coat of silver is deposited by pouring silver nitrate thereon with a reducing agent until a thickness of silver of about .00005″–.00006″ is obtained. Due to the fact that this silver coating is porous and may be easily injured, a reinforcing metallic film is electrolytically applied. Nickel is preferably applied, although other metals may be used.

After this nickel layer has been deposited, I apply, in accordance with my invention, a layer of a reducing agent. The reducing agent may be carbon in the form of graphite, for example, or any other suitable reducing agent may be used. This reducing agent may be applied in any convenient manner. I have found it convenient to apply it in the form of a paint. The following mixture is an example.

Powdered graphite_____pound__ .50
Bentonite clay _____ounces__ 4
Silicate of soda solution (specific gravity
  1.05)_____pounds__ 1.5

The last coat is made up of a mixture similar to the above, but using powdered copper instead of the powdered graphite. The following is an example for such a mixture:

Powdered copper _____pound__ .75
Bentonite clay_____ounce__ .4
Silicate of soda solution (specific gravity
  1.12)_____pounds__ 1.8

The sodium silicate which is used as the vehicle in the above-described mixtures forms an inorganic substantially non-porous layer or coating which is capable of withstanding, without disintegration, temperatures as high as 350° C. The carbon or graphite in the sodium silicate mixture forms a pigment which absorbs oxygen, which may be entrapped between the sodium silicate coating and the metal reflecting and reinforcing layers, and also forms a filler for the sodium silicate making the latter substantially impervious to air.

What I claim as new and desire to secure by Letters Patent of the United States is:

1. A reflector for light projectors comprising a transparent glass sheet having a predetermined shape, a film of metallic silver upon its surface, a reinforcing metal film applied to said silver film, and a paint applied to said metal layers, said paint comprising powdered graphite, bentonite clay, and silicate of soda solution in the relative quantities of ½ lb., 4 oz., and 1½ lbs. respectively.

2. In a reflector for light projectors comprising a transparent glass sheet having a predetermined shape, the combination of a reflecting film of metallic silver upon the surface of said sheet, a reinforcing metal film applied to said reflecting film, and a paint applied to said reinforcing film comprising a sodium silicate solution having therein a pigment which is a chemical reducing agent.

WILLIAM IRBY.